(No Model.)

J. D. WALDRAN.
VALVE GRINDER.

No. 286,095. Patented Oct. 2, 1883.

WITNESSES:
Chas. T. Howell,
C. Sedgwick

INVENTOR:
J. D. Waldran
BY Munn & Co.
ATTORNEYS.

UNITED STATES PATENT OFFICE.

JOHN D. WALDRAN, OF MEMPHIS, TENNESSEE.

VALVE-GRINDER.

SPECIFICATION forming part of Letters Patent No. 286,095, dated October 2, 1883.

Application filed March 15, 1883. (No model.)

*To all whom it may concern:*

Be it known that I, JOHN D. WALDRAN, of Memphis, county of Shelby, and State of Tennessee, have invented a new and Improved Valve-Grinder, of which the following is a full, clear, and exact description.

My invention consists of a contrivance for attachment to the wheel of a globe-valve for rotating it backward and forward on its seat by means of a spiral shaft that is operated by means of a reciprocating nut, which is operated by one hand, while the guide for the nut and support is held by the other hand, making a simple contrivance by which such valves may be ground quickly and efficiently without being disconnected from the pipes, all as hereinafter fully described.

Reference is to be had to the accompanying drawings, forming a part of this specification, in which similar letters of reference indicate corresponding parts in all the figures.

Figure 1:
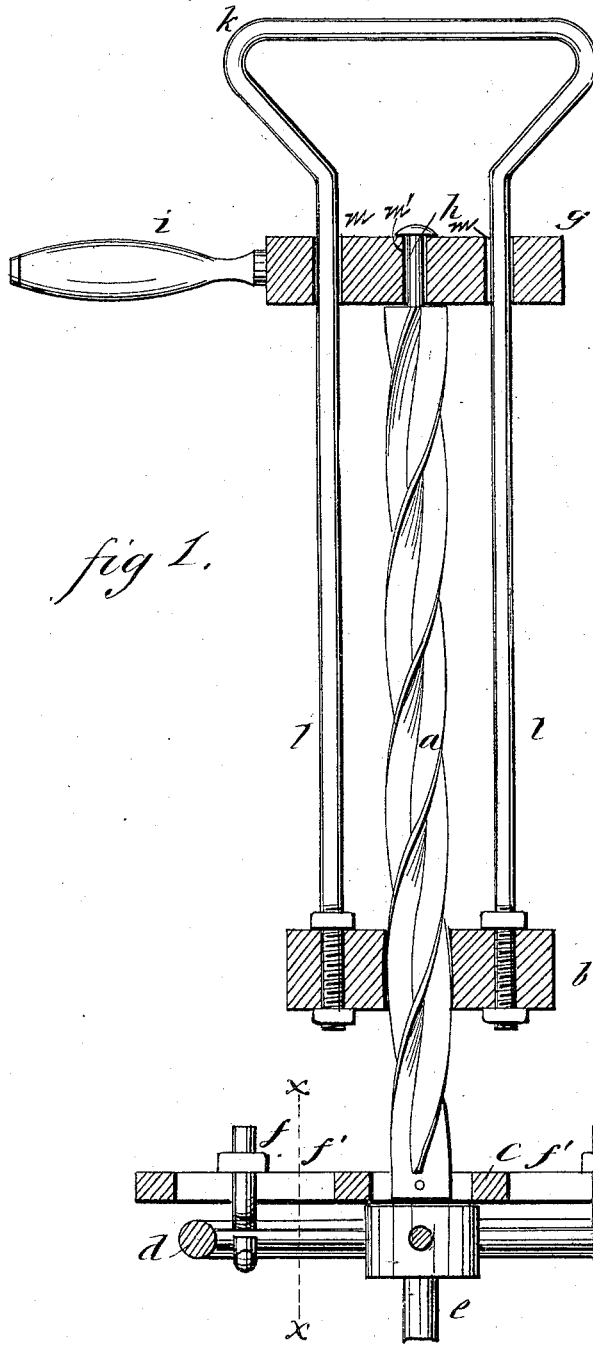
Figure 2:
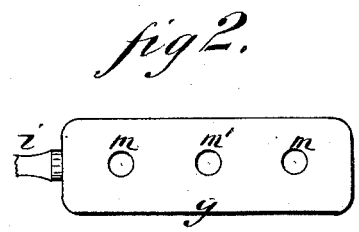
Figure 3:
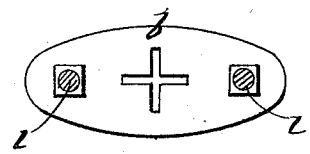
Figure 4:
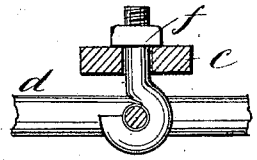

Figure 1 is a sectional elevation of my improved valve-grinder. Fig. 2 is a plan view of the guide for the rods that work the nut and the bearing for the end of the spiral shaft. Fig. 3 is a plan view of the reciprocating nut employed for working the spiral shaft and section of the rods; and Fig. 4 is a section of Fig. 1 on line $x\ x$, showing a detail of the contrivance for connecting the spiral shaft to the valve-wheel.

I take a spiral shaft, $a$, contrived to be rotated forward and backward by means of a nut, $b$, worked forward and backward along the shaft, and attach a cross-bar, $c$, to one end, and provide for connection of said bar $c$ to the hand-wheel $d$ of the stem $e$ of a globe-valve by means of clamp-hooks $f$, the bar $c$ being slotted at $f'$ to allow of adjustment of said hooks; or it may be connected by any other approved means; and I fit the other end of said shaft $a$ in a bearing, $m'$, in a block, $g$, by its journal $h$, said block being provided with a handle, $i$, by which to hold it in one hand, while reciprocating the nut $b$ by the other hand, for which a handle, $k$, is attached to said nut by means of rods $l$, passing through holes $m$ of the block $g$ for guides. The handle $i$ is also a means of pressing down on the valve by means of the shaft to facilitate the grinding.

If desired, a lever may be used to press on the head of the journal $h$ for applying greater pressure to the valve than can be done by the handle; but generally that will be sufficient, and a lever may also be used to work rods $l$. The cross-bar $c$ may be adapted for connection to the head of a plug-valve or cock for utilizing the machine for refitting such valves also. It will be seen that with this simple contrivance the taking of the valves out of their connection to put them in a lathe for re-grinding will be saved, also the labor of removing the connection. If a lever be used to press down on the shaft $a$, it is designed to bear upon the top of the blocks $g$ and have its fulcrum in any temporary contrivance—as, for instance, a chain connecting the end of the lever with the pipe in which the valve to be ground is placed. To work the rods $l$ and nut $b$ by means of a lever, the lever will have its fulcrum on the block $b$—say by a rod jointed to the block, and extending up around to and connecting with the end of the lever, which will have another connection with the handle $k$ of said rods. The handle $i$ and block $g$ prevent the nut from turning by the resistance of the shaft, the handle being held by the operator. The handle will be used for the same purpose—that is, preventing the turning of the nut when the lever is used for working it.

Having thus described my invention, I claim as new and desire to secure by Letters Patent—

1. The improved valve-grinder consisting of the spiral shaft $a$, having a connecting-bar, $c$, adapted for and provided with means to connect with the valve wheel or stem, the reciprocating nut for operating the shaft, the guide, and supporting-bar $g$, with its handle $i$, and the handle and connecting-rods $k\ l$, combined substantially as described.

2. The combination, with shaft $a$, having connecting-bar $c$ and clamp-hooks $f$, and also having a journal, $h$, of the block $g$, having handle $i$, guide-holes $m$, and the bearing $m'$ for journal $h$, also the operating-nut $b$, said nut being connected to the rods $l$ of handle $k$, said rods being arranged in the said guides $m$, substantially as described.

JOHN D. WALDRAN.

Witnesses:
WM. F. MACDOWELL,
FRED. STICHER.